US012432765B2

United States Patent
Raghavan et al.

(10) Patent No.: US 12,432,765 B2
(45) Date of Patent: Sep. 30, 2025

(54) INDICATION OF A PREFERRED CARRIER IN A PHYSICAL UPLINK CONTROL CHANNEL GROUP

(71) Applicant: QUALCOMM Incorporated, San Diego, CA (US)

(72) Inventors: Vasanthan Raghavan, West Windsor Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 17/650,815

(22) Filed: Feb. 11, 2022

(65) Prior Publication Data
US 2023/0262745 A1  Aug. 17, 2023

(51) Int. Cl.
*H04W 72/542* (2023.01)
*H04B 17/318* (2015.01)
*H04W 72/044* (2023.01)
*H04W 72/21* (2023.01)

(52) U.S. Cl.
CPC ........ *H04W 72/542* (2023.01); *H04B 17/318* (2015.01); *H04W 72/046* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 2011/0026422 A1* | 2/2011 | Ma | H04L 5/0053 370/252 |
| 2020/0068462 A1* | 2/2020 | Zetterberg | H04W 16/28 |
| 2021/0249768 A1* | 8/2021 | Ioffe | H01Q 21/205 |
| 2022/0225215 A1* | 7/2022 | Babaei | H04W 48/16 |
| 2022/0272711 A1* | 8/2022 | Syed Muhammad | H04L 5/0069 |
| 2023/0300940 A1* | 9/2023 | Jang | H04L 5/00 370/329 |
| 2023/0362919 A1* | 11/2023 | Sun | H04W 72/21 |

OTHER PUBLICATIONS

Ratasuk R., et al., "Carrier Aggregation and Dual Connectivity", ISART 2017, Nokia Bell Labs, Mobile Radio Research Lab, 2017, 14 pages.

* cited by examiner

*Primary Examiner* — Adnan Baig
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may transmit, to a network entity, information indicating a carrier, in a physical uplink control channel group, that is a preferred primary carrier for the UE for uplink control communications with the network entity. The UE may communicate based at least in part on the information. Numerous other aspects are described.

28 Claims, 11 Drawing Sheets

INDICATION OF A PREFERRED CARRIER IN A PHYSICAL UPLINK CONTROL CHANNEL GROUP

FIELD OF THE DISCLOSURE

Aspects of the present disclosure generally relate to wireless communication and to techniques and apparatuses for indication of a preferred carrier in a physical uplink control channel group.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include transmitting, to a network entity, information indicating a carrier, in a physical uplink control channel (PUCCH) group, that is a preferred primary carrier for the UE for uplink control communications with the network entity. The method may include communicating based at least in part on the information.

Some aspects described herein relate to a method of wireless communication performed by an apparatus of a network entity. The method may include receiving information indicating a carrier, in a PUCCH group, that is a preferred primary carrier for a UE for uplink control communications. The method may include communicating based at least in part on the information.

Some aspects described herein relate to an apparatus for wireless communication at a UE. The apparatus may include a memory and one or more processors coupled to the memory. The one or more processors may be configured to transmit, to a network entity, information indicating a carrier, in a PUCCH group, that is a preferred primary carrier for the UE for uplink control communications with the network entity. The one or more processors may be configured to communicate based at least in part on the information.

Some aspects described herein relate to an apparatus for wireless communication at a network entity. The apparatus may include a memory and one or more processors coupled to the memory. The one or more processors may be configured to receive information indicating a carrier, in a PUCCH group, that is a preferred primary carrier for a UE for uplink control communications. The one or more processors may be configured to communicate based at least in part on the information.

Some aspects described herein relate to a non-transitory computer-readable medium that stores a set of instructions for wireless communication by a UE. The set of instructions, when executed by one or more processors of the UE, may cause the UE to transmit, to a network entity, information indicating a carrier, in a PUCCH group, that is a preferred primary carrier for the UE for uplink control communications with the network entity. The set of instructions, when executed by one or more processors of the UE, may cause the UE to communicate based at least in part on the information.

Some aspects described herein relate to a non-transitory computer-readable medium that stores a set of instructions for wireless communication by a network entity. The set of instructions, when executed by one or more processors of the network entity, may cause the network entity to receive information indicating a carrier, in a PUCCH group, that is a preferred primary carrier for a UE for uplink control communications. The set of instructions, when executed by one or more processors of the network entity, may cause the network entity to communicate based at least in part on the information.

Some aspects described herein relate to an apparatus for wireless communication. The apparatus may include means for transmitting, to a network entity, information indicating a carrier, in a PUCCH group, that is a preferred primary carrier for the apparatus for uplink control communications with the network entity. The apparatus may include means for communicating based at least in part on the information.

Some aspects described herein relate to an apparatus for wireless communication. The apparatus may include means for receiving information indicating a carrier, in a PUCCH group, that is a preferred primary carrier for a UE for uplink control communications. The apparatus may include means for communicating based at least in part on the information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
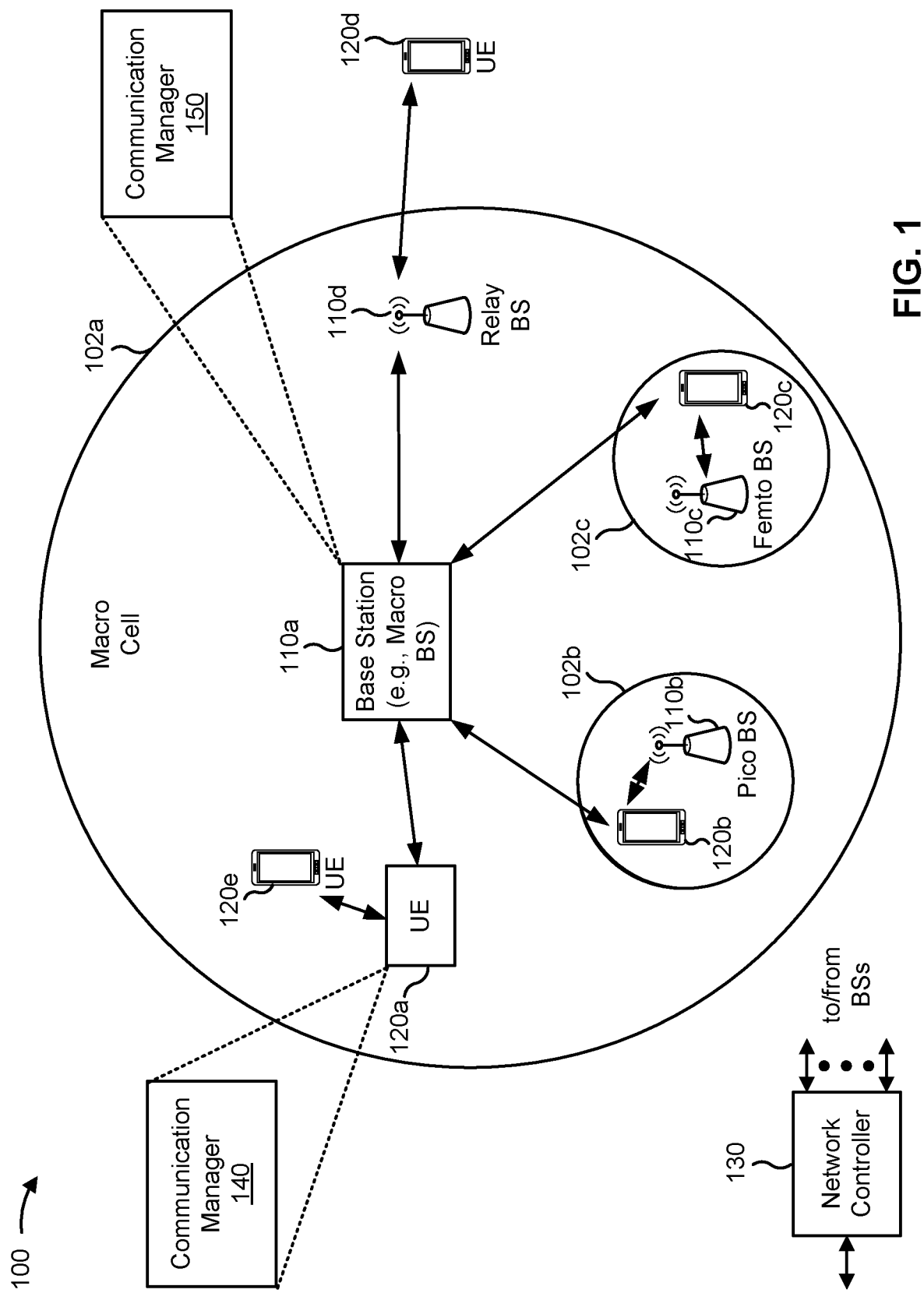
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network entity, information indicating a carrier, in a physical uplink control channel (PUCCH) group, that is a preferred primary carrier for the UE for uplink control communications with the network entity; and communicate based at least in part on the information. Additionally, or alternatively, the communication manager 140 may perform one or more other operations described herein.

In some aspects, the base station 110 may include a communication manager 150. As described in more detail elsewhere herein, the communication manager 150 may receive information indicating a carrier, in a PUCCH group, that is a preferred primary carrier for a UE for uplink control communications; and communicate based at least in part on the information. Additionally, or alternatively, the communication manager 150 may perform one or more other operations described herein.

As indicated above, FIG. 1 is provided as an example. Other examples may differ from what is described with regard to FIG. 1.

Figure 2:
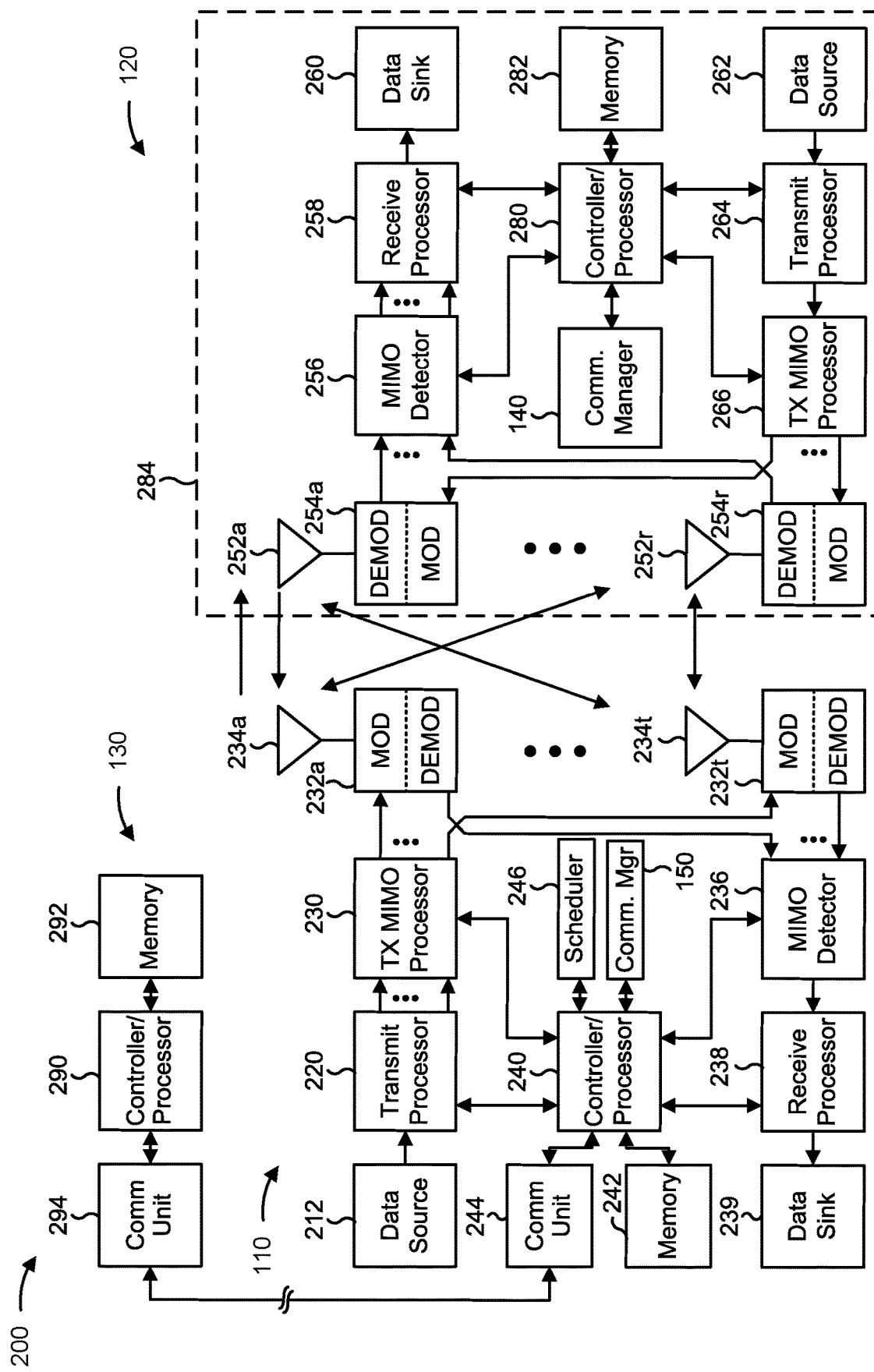
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with indication of a preferred carrier in a PUCCH group, as described in more detail elsewhere herein. In some aspects, the network entity described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/ or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR BS, 5G NB, access point (AP), a TRP, or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
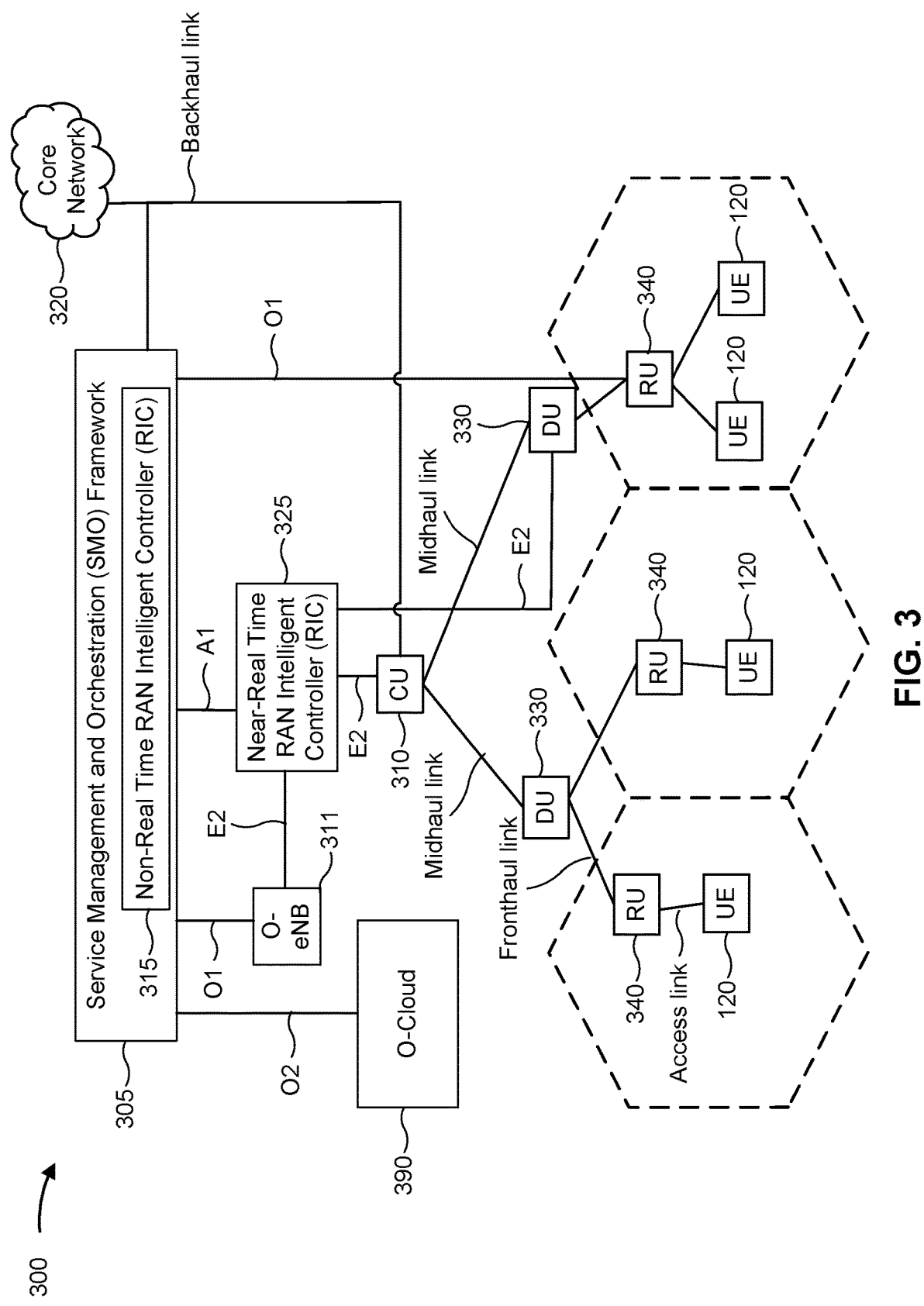
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
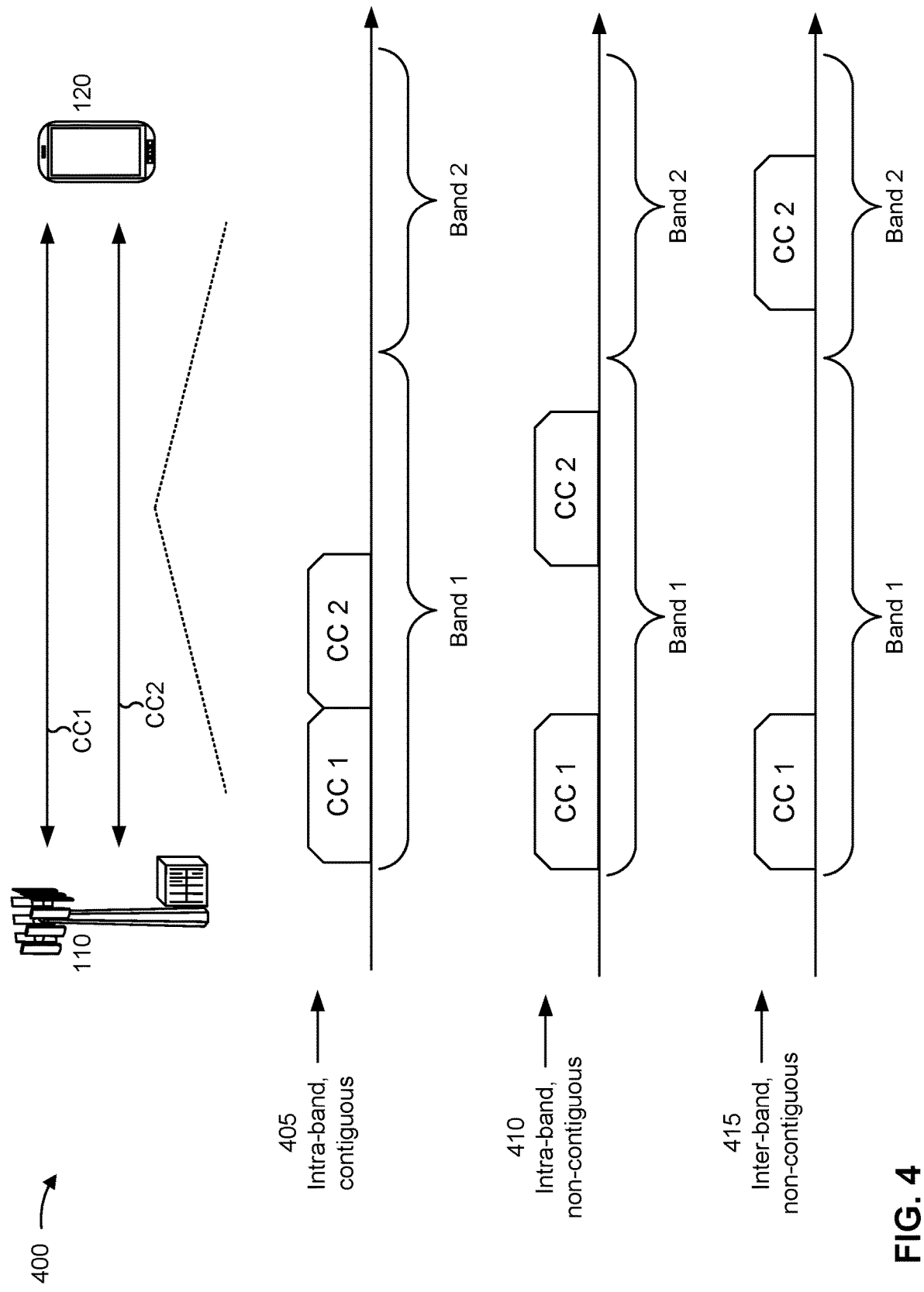
FIG. 4 is a diagram illustrating an example of carrier aggregation, in accordance with the present disclosure.

FIG. 4 is a diagram illustrating an example 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in an RRC message, downlink control information (DCI), and/or another signaling message (e.g., a medium access control-control element (MAC-CE) message).

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some examples of carrier aggregation, five or more carriers of the same frame structure may be aggregated. In some examples of carrier aggregation, inter-band time division duplexing (TDD) carriers having different uplink and downlink configurations may be aggregated, carriers associated with multiple uplink timing advances may be aggregated, and/or carriers with different frame structures may be aggregated. In carrier aggregation, uplink control information for all aggregated carriers may be transmitted on a PUCCH of a primary carrier (e.g., a PCell). However, with an increased quantity of aggregated carriers, overloading of the PUCCH on the PCell may result. Thus, in some cases, a PUCCH may be supported on an SCell in carrier aggregation.

As indicated above, FIG. 4 is provided as an example. Other examples may differ from what is described with regard to FIG. 4.

Figure 5:
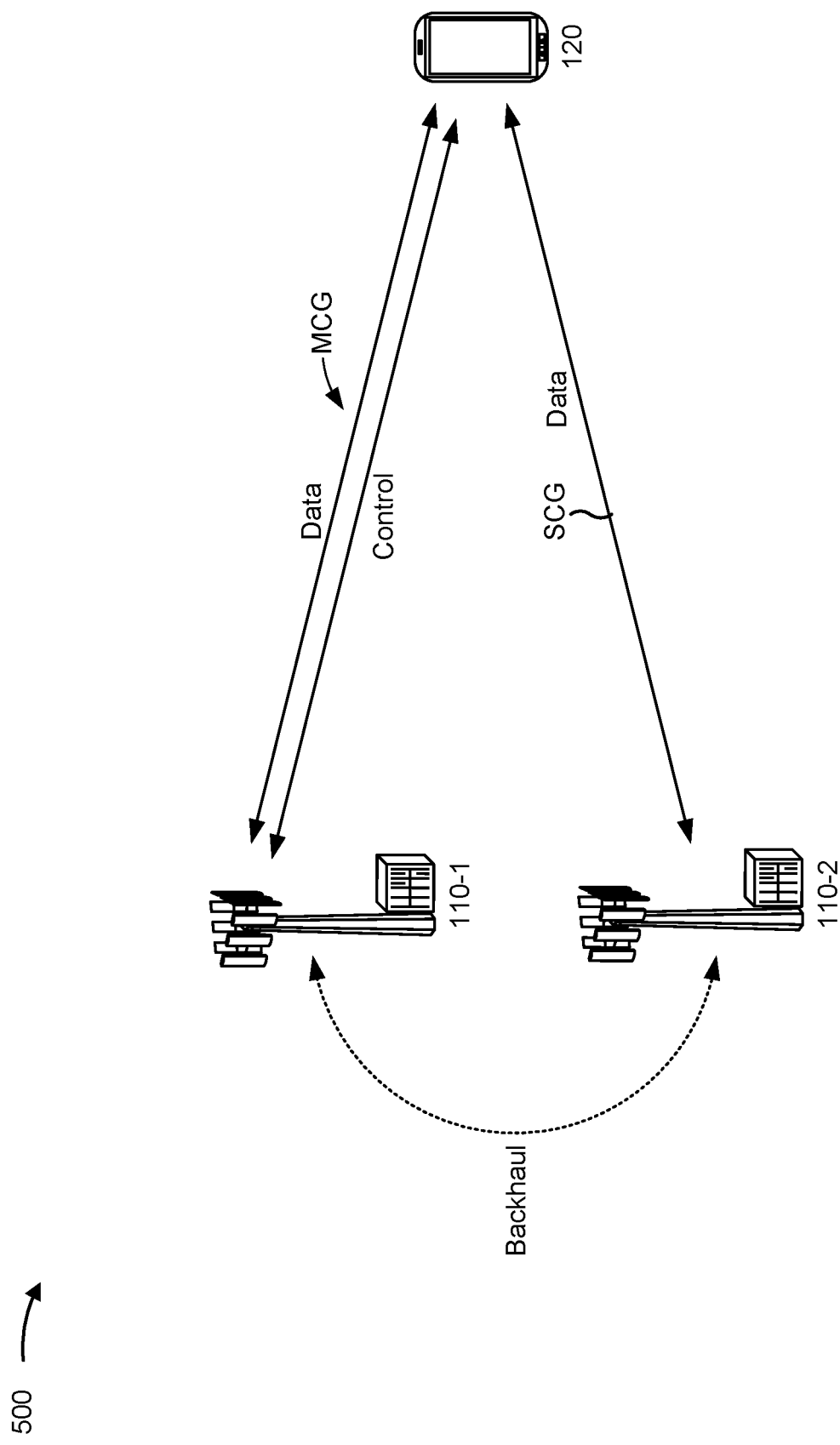
FIG. 5 is a diagram illustrating an example of dual connectivity, in accordance with the present disclosure.

FIG. 5 is a diagram illustrating an example 500 of dual connectivity, in accordance with the present disclosure.

Similar to carrier aggregation, some wireless communication systems permit dual connectivity of a UE 120 to a network. For example, with dual connectivity, the UE 120 may connect to the network via multiple cell groups, such as a master cell group (MCG), which may include one or more serving cells associated with a master node (MN) 110-1, and a secondary cell group (SCG), which may include one or more serving cells associated with a secondary node (SN) 110-2. Each SCG may include a primary secondary cell (PSCell) and one or more secondary cells (SCells).

Dual connectivity enables simultaneous transmission and reception of data on multiple component carriers from multiple cell groups via multiple base stations (e.g., on an MCG via the MN 110-1 and on an SCG via the SN 110-2). A dual connectivity of the UE 120 may include a standalone (SA) deployment in which the MCG and the SCG use an NR RAT, or a non-standalone (NSA) deployment in which the MCG and the SCG use different ones of an LTE RAT and an NR RAT (e.g., the UE 120 may be connected using an LTE RAT and an NR RAT at the same time). For example, in the NSA deployment, the MCG may use an LTE RAT or an NR RAT. A dual connectivity of the UE 120 may be an Evolved Universal Mobile Telecommunications System Terrestrial Radio Access (E-UTRA)-NR dual connectivity (ENDC) mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT).

In some examples, the MCG may anchor a network connection between the UE 120 and a core network (e.g., for mobility, coverage, and/or control plane information), and the SCG may be added as additional carriers to increase throughput (e.g., for data traffic and/or user plane information). In some examples, the MN and the SN may not transfer user plane information between one another. In some examples, the MN and the SN may exchange information via a backhaul link (e.g., using an X2 interface). In some examples, the MCG may be associated with a first frequency band (e.g., a sub-6 GHz band and/or an FR1 band) and the SCG may be associated with a second frequency band (e.g., a millimeter wave band and/or an FR2 band).

In some cases, a group of carriers (e.g., used for dual connectivity or carrier aggregation, as described in connection with FIG. 4) may form a PUCCH group. "PUCCH group" may refer to a group of carriers that includes a primary carrier (e.g., a PCell) and one or more secondary carriers (e.g., SCells). The primary carrier (e.g., preferred carrier) may be used for all PUCCH communications (e.g., uplink control information (UCI), such as acknowledgment (ACK) or negative acknowledgment (NACK) feedback) for the PUCCH group. The primary carrier for the PUCCH group may be configured by a base station (e.g., base station 110 in FIG. 4, MN 110-1, SN 110-2, or the like).

In dual connectivity or carrier aggregation across multiple bands, one carrier may be in a first frequency range and another carrier may be in a second frequency range. For example, the first frequency range and the second frequency range may be one of FR1, FR2, FR3, FR4 (e.g., FR4-1 or FR4), or FR5. In dual connectivity across two bands, a preferred carrier for a PCell may be in the first frequency range, and a carrier for a PSCell may be in the second frequency range. In carrier aggregation across two bands, a PCell PUCCH may be in the first frequency range, and an SCell PUCCH may be in the second frequency range.

For operation in the first frequency range and the second frequency range, the UE 120 may indicate a UE capability for two PUCCH groups (e.g., using a twoPUCCH-Group parameter for UE capability information). For example, the UE 120 may indicate whether two PUCCH groups in carrier aggregation with a same numerology across component carriers for a data channel and a control channel (e.g., at a given time) are supported by the UE 120. Here, for NR carrier aggregation, two PUCCH groups may be supported with the same numerology across NR carriers for a data channel and a control channel at a given time. For EN-DC, two PUCCH groups may be supported with the same numerology across NR carriers for a data channel and a control channel at a given time, where an NR PUCCH group is configured in FR1 and another NR PUCCH group is configured in FR2.

As indicated above, FIG. 5 is provided as an example. Other examples may differ from what is described with respect to FIG. 5.

Figure 6:
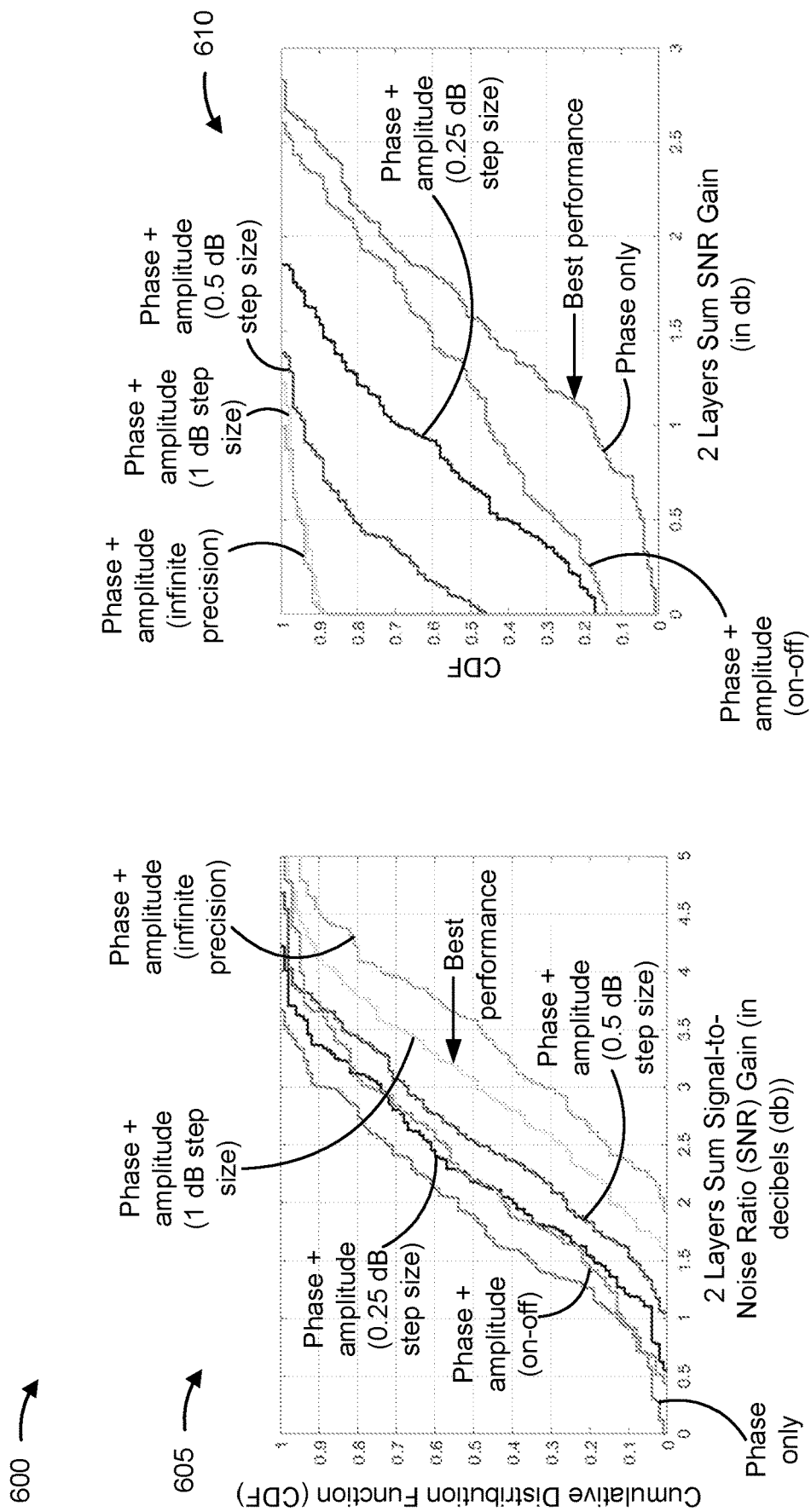
FIG. 6 is a diagram illustrating an example of uplink and downlink beamforming schemes, in accordance with the present disclosure.

FIG. 6 is a diagram illustrating an example 600 of uplink and downlink beamforming schemes, in accordance with the present disclosure.

In analog or hybrid beamforming systems, weighting factors (also referred to as "beam weights") may be used at the radio frequency and in connection with different antenna elements to improve signal power and/or signal quality. For example, the beam weights may indicate phase and/or gain that are to be applied for the antenna elements. Thus, amplitude control and/or phase control may be used to determine beam weights for downlink and/or uplink. Beam weights may be selected to address dynamic conditions, such as rich channels (e.g., additional clusters providing propagation paths from a transmitter to a receiver, wider angular spread of dominant clusters in a channel, or the like), hand blockage, UE material-based distortions of an effective array response vector observed over a multi-antenna array, or the like.

Using different amplitude control settings may improve downlink performance by reducing noise at antenna elements experiencing poor signal strength and by improving the quality of signals from antenna elements experiencing better signal strength. However, using amplitude control for uplink may result in performance loss as power amplifier (PA) power and effective isotropic radiated power (EIRP) are reduced. In particular, each individual antenna element may have a PA, and thus amplitude control may reduce array gain as well as EIRP because the PAs are backed off by the amplitude control specification. Graphs 605 and 610 illustrate downlink performance and uplink performance, respectively, in a channel with a hand blockage condition, where signals on some antenna elements are distorted/adjusted using various amplitude control and/or phase control schemes. Graph 605 shows that downlink performance may be improved using a scheme with amplitude and phase control. Conversely, graph 610 shows that uplink performance suffers using the same scheme of amplitude and phase control, and that uplink performance may be improved using a scheme with only phase control. In other words, in some beamformed communications, the use of entirely different sets of amplitude control and/or phase control schemes for downlink and uplink may improve performance.

In some cases, a UE may support beam correspondence between uplink and downlink beamformed transmissions. Here, beam correspondence refers to the UE identifying uplink and downlink beams for communication using the same set of measurements (e.g., typically, measurements of downlink reference signals). In beamformed communication (e.g., in FR2), different downlink and uplink schemes may be utilized by suspending beam correspondence. However, suspending beam correspondence results in significant overhead (e.g., signaling/control channel overhead, latency, power usage, and/or thermal overhead) as separate uplink beam training and downlink beam training are needed. On the other hand, performance may be degraded if the UE is constrained to using beam correspondence for uplink and downlink beamformed transmissions, as an amplitude control scheme that benefits downlink performance may result in poor uplink performance (e.g., due to EIRP loss).

In some examples, a UE may be capable of performing amplitude control for downlink and/or uplink beamforming. That is, the UE may be capable of suspending beam correspondence for downlink and uplink beamformed transmissions. Here, amplitude control/beam correspondence suspension may be an implementation choice of the UE. Thus, a base station may select a primary carrier (e.g., a preferred carrier) for a PUCCH group without knowledge of whether the UE is applying amplitude control/beam correspondence suspension. Accordingly, the carrier selected by the base station may not be as suitable for use as a primary carrier as another carrier (e.g., a carrier where beam correspondence is suspended), thereby degrading a performance of communications between the UE and the base station because PUCCH communications may not be communicated as reliably on the carrier selected by the base station as the other carrier. In an example of dual connectivity or carrier aggregation in FR1 and FR2, the UE may perform downlink and uplink communication in FR1 with beam correspondence, and the UE may perform downlink and uplink communication in FR2 with beam correspondence suspended (e.g., because amplitude and/or phase control settings used in downlink may not be desirable for uplink). Continuing with the example, a carrier in FR1 may be the preferred carrier of the UE for a PUCCH group, while a carrier in FR2 may be less preferred by the UE.

Some techniques and apparatuses described herein enable a UE to indicate a preferred carrier in a PUCCH group. In some aspects, the UE may transmit information indicating a carrier in a PUCCH group that is preferred by the UE as a primary carrier for uplink control communications. By using the preferred carrier for uplink control communication, a performance of communications of the UE may be improved. In particular, the UE may transmit UCI with improved reliability using the preferred carrier, thereby reducing resource consumption due to retransmissions, signaling overhead, power consumption, or the like. Moreover, the UE may determine the preferred carrier based at least in part on whether amplitude control is enabled for the UE and/or a type of amplitude control that is being used. Accordingly, the preferred carrier indicated by the UE may be more suitable (e.g., relative to selection by a base station) for the particular amplitude control/beam correspondence suspension implementation choice of the UE.

As indicated above, FIG. 6 is provided as an example. Other examples may differ from what is described with respect to FIG. 6.

Figure 7:
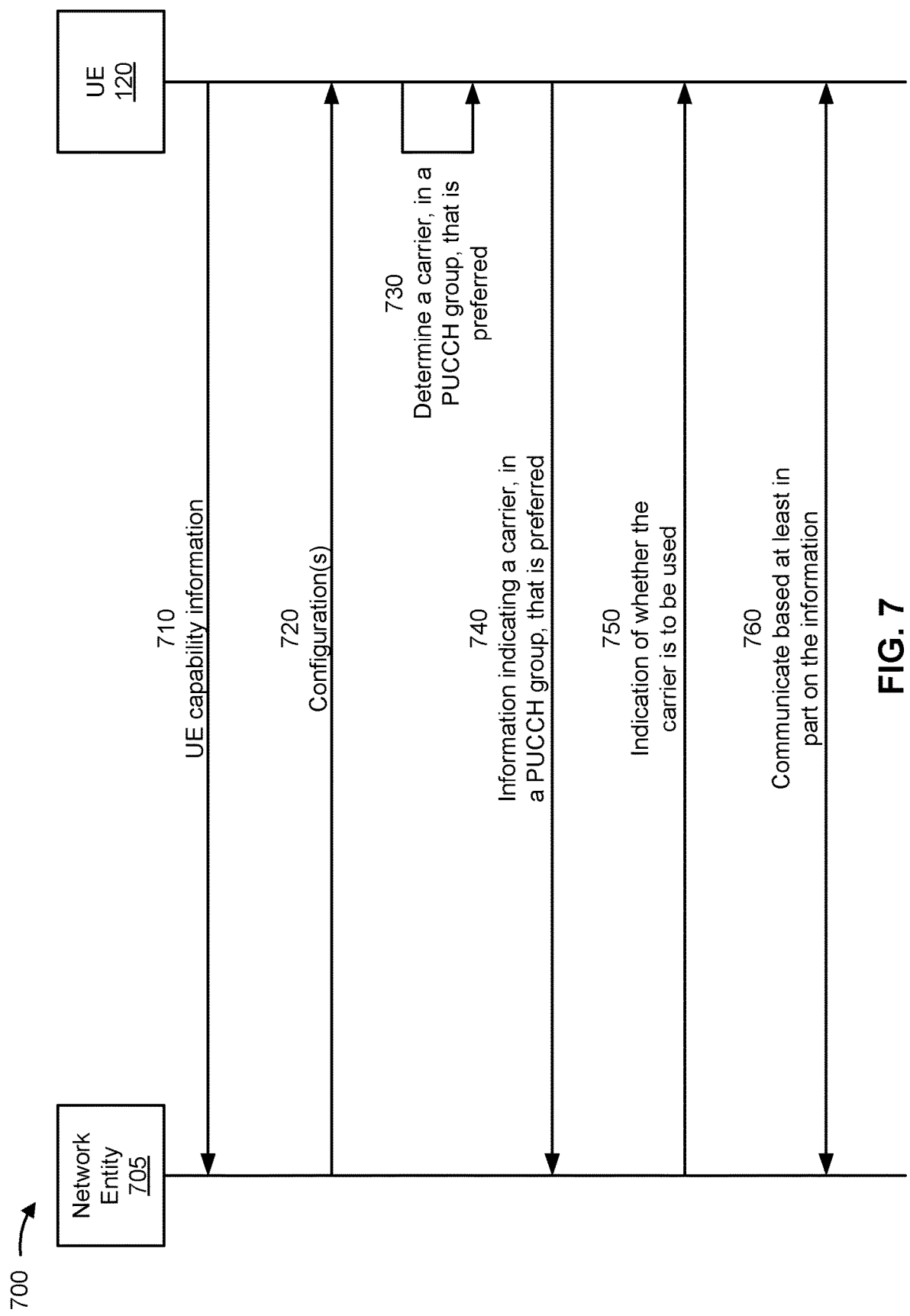
FIG. 7 is a diagram illustrating an example associated with indication of a preferred carrier in a physical uplink control channel (PUCCH) group, in accordance with the present disclosure.

FIG. 7 is a diagram illustrating an example 700 associated with indication of a preferred carrier in a PUCCH group, in accordance with the present disclosure. Example 700 includes a network entity 705 and a UE 120. As described herein, the network entity 705 may include a base station 110 or one or more components of a disaggregated base station 110 (e.g., a CU 310, a DU 330, an RU 340, or the like).

As shown by reference number 710, the UE 120 may transmit, and the network entity 705 may receive, UE capability information (e.g., in response to a UE capability request from the network entity 705). The UE capability information may indicate an amplitude control capability of the UE 120. That is, the UE 120 may be capable of selectively enabling amplitude control for beamforming (e.g., for uplink beamforming). Accordingly, the UE 120 may be capable of selectively suspending beam correspondence for downlink and uplink beamformed transmissions by enabling amplitude control for at least one of downlink beamforming or uplink beamforming. In some aspects, the UE capability information may indicate a capability of the UE 120 for communicating with two PUCCH groups.

As shown by reference number 720, the network entity 705 may transmit, and the UE 120 may receive, information indicating one or more configurations for the UE 120 (e.g., that are based at least in part on the UE capability information). In some aspects, the configurations may include a configuration of a PCell and one or more SCells for carrier aggregation. In some aspects, the configurations may include a configuration of an MCG and an SCG for dual connectivity. In some aspects, the configurations may include a configuration of one or more PUCCH groups. For example, a configuration for a PUCCH group may indicate multiple carriers that form the PUCCH group. In some aspects, the UE 120 may be configured with a first PUCCH group of multiple carriers in a first band and a second PUCCH group of multiple carriers in a second band. In some aspects, the UE 120 may be configured with a PUCCH group of at least one carrier in a first band and at least one carrier in a second band.

In some aspects, the configurations may include a configuration indicating a condition for transmitting preferred carrier information in a beam management report. For example, the configuration may indicate a signal strength threshold (e.g., a threshold for RSRP, RSRQ, RSSI, signal-to-noise ratio (SNR), or signal-to-interference-plus-noise ratio (SINR) that is configured or otherwise provisioned for the UE 120) for causing (e.g., if a difference between a downlink signal strength and an uplink signal strength satisfies the signal strength threshold) the UE 120 to transmit the preferred carrier information in the beam management report. As another example, the configuration may indicate a condition that is an event for causing (e.g., if the event occurs) the UE 120 to transmit the preferred carrier information in the beam management report. The event may be an expected uplink loss (e.g., an expected uplink EIRP loss), due to amplitude control, exceeding a threshold (e.g., a threshold that is configured or otherwise provisioned for the UE 120). In other words, the configuration may indicate that the UE 120 is to transmit the preferred carrier information if the expected uplink loss exceeds a threshold.

In some aspects, the UE 120 may determine an uplink loss (e.g., an uplink EIRP loss) that may result from the use of amplitude control. In an example of dual connectivity or carrier aggregation in FR1 and FR2, if the determined uplink EIRP loss satisfies a threshold, then a first carrier (e.g., a carrier in FR1) may be a preferred carrier indicated by the UE 120, whereas if the determined uplink EIRP loss does not satisfy the threshold, then a second carrier (e.g., a carrier in FR2) may be a preferred carrier indicated by the UE 120. In some aspects, preferred carrier indication by the UE 120, as described herein, may be activated if the uplink loss satisfies the threshold. In some aspects, if the uplink loss does not satisfy the threshold, preferred carrier indication by the UE 120 may be deactivated.

As shown by reference number 730, the UE 120 may determine a carrier, in a PUCCH group, that is a preferred primary carrier for the UE 120 for uplink control communications (e.g., for communicating UCI) with the network entity 705. That is, the UE 120 may determine a respective preferred primary carrier for each PUCCH group for the UE 120. The UE 120 may determine a carrier that is preferred by the UE 120 based at least in part on whether amplitude control is enabled by the UE 120, a type of amplitude control (e.g., a type of amplitude control quantization) that is used by the UE 120 (e.g., step sizes, dynamic range, accuracy around a nominal value, or the like), or the like. Thus, a "preferred" carrier of the UE 120 may be a carrier that is selected or otherwise chosen by the UE 120, determined by the UE 120 (e.g., as described herein), given a higher priority by the UE 120, or the like. In some cases, a "preferred carrier" as used herein may be used synonymously with a "UE indicated carrier," a "UE selected carrier," a "UE determined carrier," or the like.

In some aspects, the UE 120 may determine a frequency band (e.g., among frequency bands of the carriers of the PUCCH group(s) for the UE 120) that is preferred by the UE 120 for uplink control communication (as well as a carrier, in the frequency band, that is preferred by the UE 120). The UE 120 may determine a frequency band that is preferred by the UE 120 based at least in part on whether amplitude control is enabled by the UE 120, a type of amplitude control (e.g., a type of amplitude control quantization) that is used by the UE 120 (e.g., step sizes, dynamic range, accuracy around a nominal value, or the like), or the like.

In some aspects, the UE 120 may determine a component carrier, of one or more component carriers, within a frequency group (e.g., a group of frequency bands), of one or more frequency groups, that is preferred by the UE 120 for uplink control communications. The UE 120 may determine a component carrier that is preferred by the UE 120 based at least in part on whether amplitude control is enabled by the UE 120, a type of amplitude control (e.g., a type of amplitude control quantization) that is used by the UE 120 (e.g., step sizes, dynamic range, accuracy around a nominal value, or the like), or the like. In some aspects, the one or more component carriers, from which the component carrier is selected, may be within a frequency range or across multiple frequency ranges (e.g., the component carrier may be selected from among multiple component carriers that are across multiple frequency ranges).

As shown by reference number 740, the UE 120 may transmit, and the network entity may receive, information indicating (e.g., requesting) a carrier, in a PUCCH group, that is a preferred primary carrier for the UE 120 for uplink control communications with the network entity. That is, the information may indicate a respective preferred primary carrier for the UE 120 for each PUCCH group for the UE 120. As described herein, the carriers across different PUCCH groups may be in different frequency bands and/or the carriers in a PUCCH group may be in different frequency bands. Thus, the one or more carriers indicated by the information may be those that are preferred by the UE 120 across multiple frequency bands. For example, the information may indicate a first carrier, in a first PUCCH group of carriers in a first frequency band, that is a preferred primary carrier for the UE 120, and a second carrier, in a second PUCCH group of carriers in a second frequency band, that is preferred primary carrier for the UE 120. The preferred carrier(s) of the UE 120 may be used to improve uplink control communication, particularly where the UE 120 is capable of selectively employing amplitude control.

In some aspects, the information may indicate a frequency band that is preferred by the UE 120 for uplink control communication. For example, the information may indicate a frequency band preferred by the UE 120 among frequency bands of the carriers of the PUCCH group(s) for the UE 120. In some aspects, the information may indicate the frequency band preferred by the UE 120 and an associated (e.g., in the frequency band) carrier preferred by the UE 120 in a PUCCH group. Thus, the information may facilitate the UE 120 to use (e.g., revert to) a frequency band (e.g., in FR1 or FR3) for uplink control communication while using another frequency band (e.g., in FR2) for downlink data communication, thereby improving reliability and performance. Further, the information may indicate one or more preferred carriers for particular slot format indicators (SFIs). For example, an SFI associated with all downlink symbols may indicate a different preferred carrier than an SFI associated with a mixed set of uplink and downlink symbols. In some aspects, the information may indicate a component carrier of one or more component carriers within a frequency group, of one or more frequency groups, that is preferred by the UE 120 for uplink control communications. For example, the one or more component carriers may be within a frequency range or the one or more component carriers may be across a plurality of frequency ranges.

In some aspects, the UE 120 may transmit the information to at least one TRP of a multi-TRP configuration. For example, the UE 120 may transmit the information respectively to multiple TRPs of a multi-TRP configuration. In some aspects, the UE 120 may transmit the information in a beam management report (e.g., that includes information indicating beam measurements for use in beam selection, beam refinement, or the like). The beam management report may indicate a Layer 1 (L1) RSRP measurement and/or a signal strength measurement (e.g., an RSRQ measurement, an RSSI measurement, an SINR measurement, an SNR measurement, or the like). In other words, when the UE 120 is reporting an L1 RSRP measurement and/or signal strength measurement for beam management, the UE 120 may additionally indicate the information (e.g., indicating that a different carrier from a current carrier can be used). The UE 120 may transmit the information in the beam management report based at least in part on the condition for transmitting preferred carrier information in a beam management report being satisfied (e.g., based at least in part on detecting that the signal strength threshold is satisfied and/or detecting the occurrence of the event). In this way, the UE 120 may dynamically signal the preferred carrier(s) of the UE 120.

As shown by reference number 750, the network entity 705 may transmit, and the UE 120 may receive, an indication of whether the carrier(s) preferred by the UE 120 are to be used for uplink control communications. In other words, the indication may accept (e.g., allow for use for uplink control communications) or reject (e.g., disallow for use for uplink control communications) the preferred carrier(s) indicated by the UE 120. If the preferred carrier(s) indicated by the UE 120 are disallowed for use for uplink control communications, then the UE 120 may use a carrier indicated by the network entity (e.g., in the configuration of the PUCCH group(s)) for uplink control communications for a PUCCH group. In some aspects, the network entity may disallow the UE 120 from indicating and using preferred carrier(s) by providing a configuration for the UE 120, as described herein, indicating that amplitude control is not to be used by the UE 120 (e.g., even though the UE 120 has indicated an amplitude control capability).

As shown by reference number 760, the UE 120 and the network entity 705 may communicate based at least in part on the information transmitted by the UE 120. For example, if the indication from the network entity 705 accepts the preferred carrier(s) indicated by the UE 120 in the information, then the UE 120 may transmit, and the network entity 705 may receive, UCI for carriers in a PUCCH group on the primary carrier preferred by the UE 120. Otherwise, the UE 120 may transmit, and the network entity 705 may receive, UCI for carriers in a PUCCH group on a primary carrier indicated by the network entity 705.

As indicated above, FIG. 7 is provided as an example. Other examples may differ from what is described with respect to FIG. 7.

Figure 8:
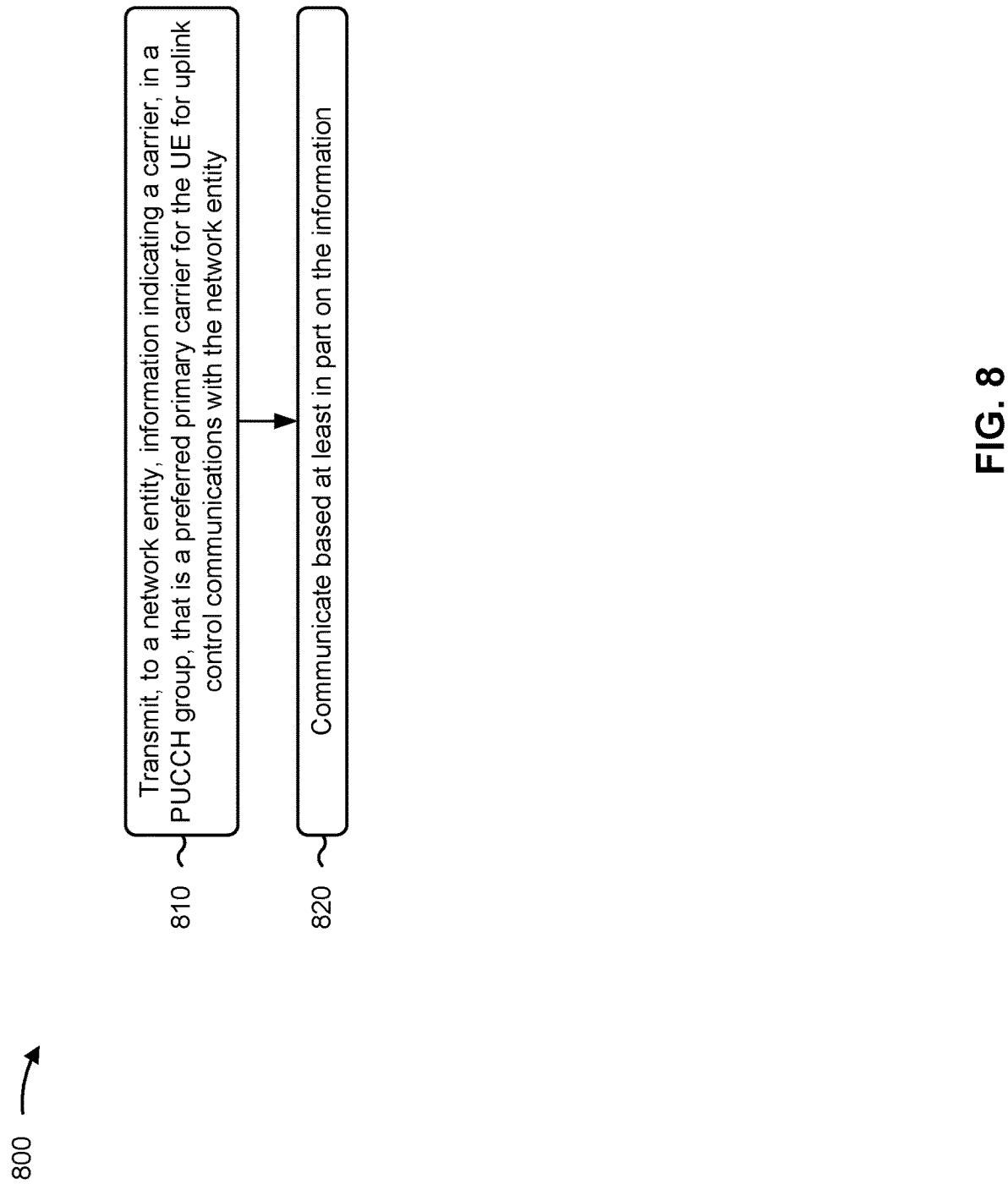
FIGS. 8-9 are diagrams illustrating example processes associated with indication of a preferred carrier in a PUCCH group, in accordance with the present disclosure.

FIG. 8 is a diagram illustrating an example process 800 performed, for example, by a UE, in accordance with the present disclosure. Example process 800 is an example where the UE (e.g., UE 120) performs operations associated with indication of a preferred carrier.

As shown in FIG. 8, in some aspects, process 800 may include transmitting, to a network entity, information indicating a carrier, in a PUCCH group, that is a preferred primary carrier for the UE for uplink control communications with the network entity (block 810). For example, the UE (e.g., using communication manager 140 and/or transmission component 1004, depicted in FIG. 10) may transmit, to a network entity, information indicating a carrier, in a PUCCH group, that is a preferred primary carrier for the UE for uplink control communications with the network entity, as described above.

As further shown in FIG. 8, in some aspects, process 800 may include communicating based at least in part on the information (block 820). For example, the UE (e.g., using communication manager 140 and/or transmission component 1004, depicted in FIG. 10) may communicate based at least in part on the information, as described above.

Process 800 may include additional aspects, such as any single aspect or any combination of aspects described below and/or in connection with one or more other processes described elsewhere herein.

In a first aspect, the information indicating the carrier indicates a component carrier from among one or more component carriers within a frequency group, from among one or more frequency groups, that is preferred by the UE for uplink control communications.

In a second aspect, alone or in combination with the first aspect, the one or more component carriers are within a frequency range or are across multiple frequency ranges.

In a third aspect, alone or in combination with one or more of the first and second aspects, transmitting the information comprises transmitting the information to at least one TRP of a multi-TRP configuration.

In a fourth aspect, alone or in combination with one or more of the first through third aspects, the information is transmitted in a beam management report that indicates an RSRP measurement or a signal strength measurement.

Figure 10:
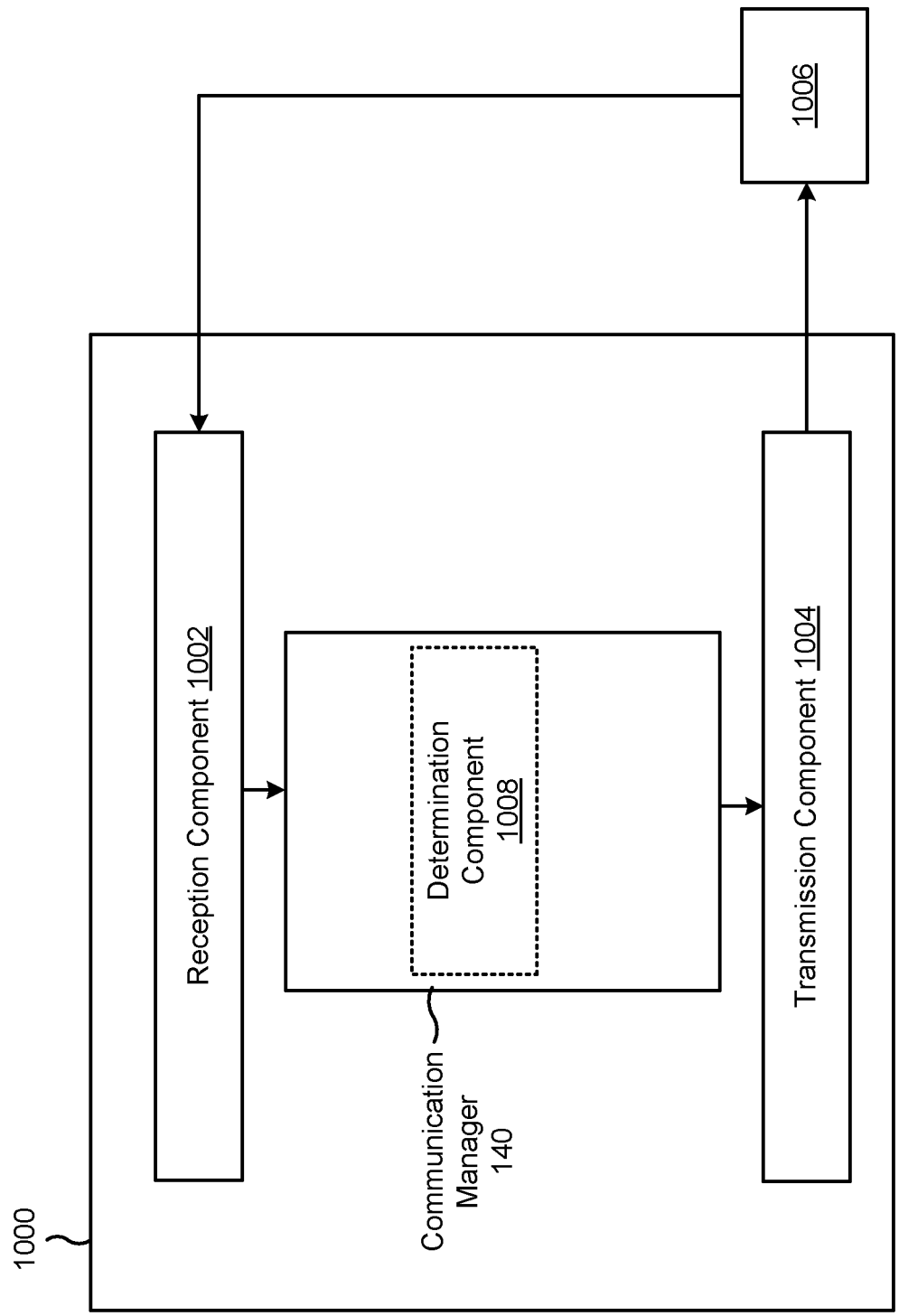
FIGS. 10-11 are diagrams of example apparatuses for wireless communication, in accordance with the present disclosure.

In a fifth aspect, alone or in combination with one or more of the first through fourth aspects, process 800 includes receiving (e.g., using communication manager 140 and/or reception component 1002, depicted in FIG. 10), from the network entity, a configuration indicating a condition for transmitting the information in the beam management report, where the information is transmitted in the beam management report based at least in part on the condition being satisfied.

In a sixth aspect, alone or in combination with one or more of the first through fifth aspects, the condition is that a difference between a downlink signal strength and an uplink signal strength satisfies a threshold.

In a seventh aspect, alone or in combination with one or more of the first through sixth aspects, process 800 includes receiving (e.g., using communication manager 140 and/or reception component 1002, depicted in FIG. 10), from the network entity, an indication of whether the carrier is to be used for uplink control communications.

In an eighth aspect, alone or in combination with one or more of the first through seventh aspects, the UE is capable of suspending beam correspondence for downlink and uplink beamformed transmissions by enabling amplitude control for at least one of downlink beamforming or uplink beamforming.

In a ninth aspect, alone or in combination with one or more of the first through eighth aspects, process 800 includes determining (e.g., using communication manager 140 and/or determination component 1008, depicted in FIG. 10) the carrier that is the preferred primary carrier for the UE based at least in part on at least one of whether amplitude control is enabled or a type of amplitude control that is used.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
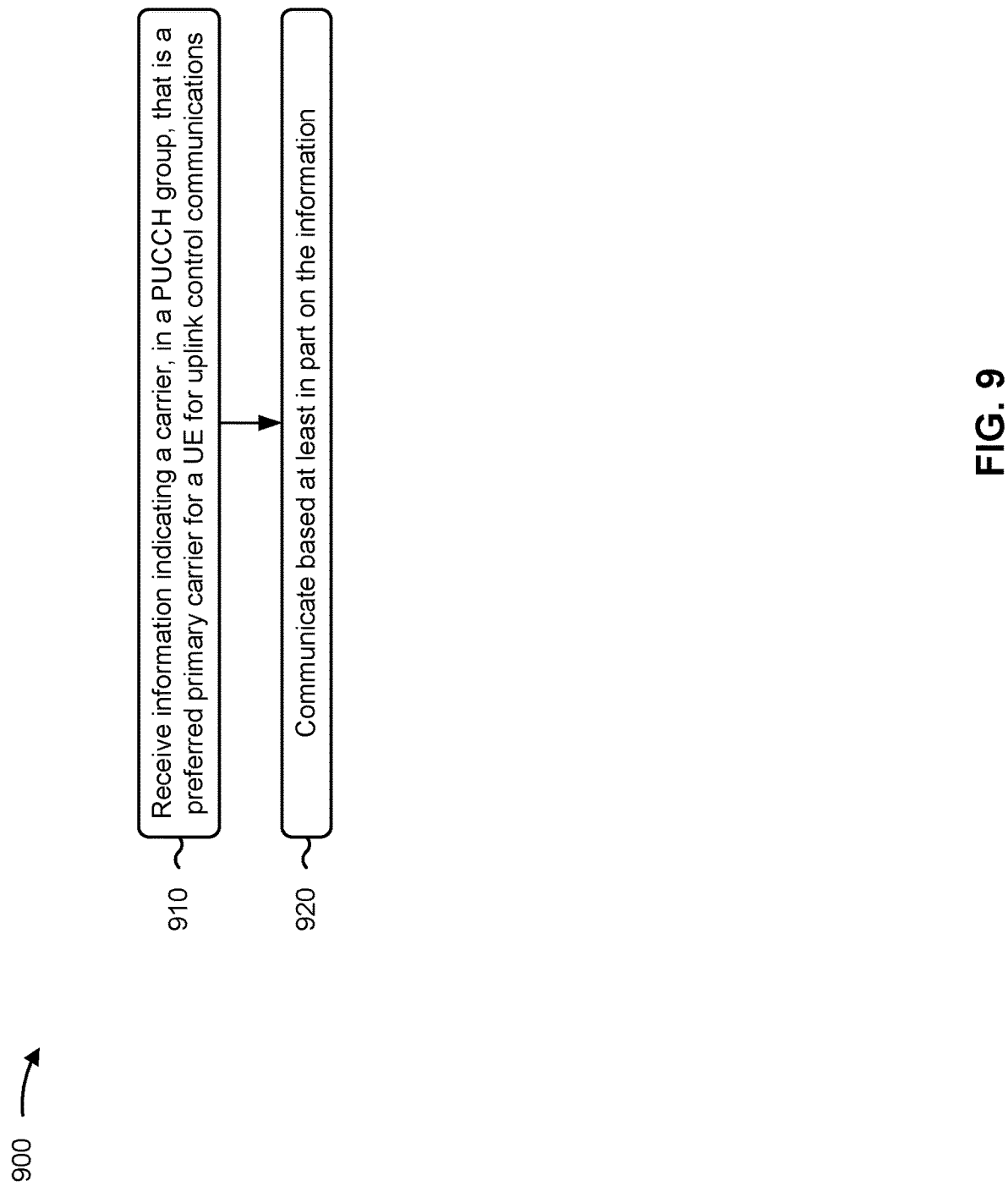

FIG. 9 is a diagram illustrating an example process 900 performed, for example, by a network entity, in accordance with the present disclosure. Example process 900 is an example where the network entity (e.g., network entity 705) performs operations associated with indication of a preferred carrier.

As shown in FIG. 9, in some aspects, process 900 may include receiving information indicating a carrier, in a PUCCH group, that is a preferred primary carrier for a UE for uplink control communications (block 910). For example, the network entity (e.g., using communication manager 1108 and/or reception component 1102, depicted in FIG. 11) may receive information indicating a carrier, in a PUCCH group, that is a preferred primary carrier for a UE for uplink control communications, as described above.

As further shown in FIG. 9, in some aspects, process 900 may include communicating based at least in part on the information (block 920). For example, the network entity (e.g., using communication manager 1108 and/or reception component 1102, depicted in FIG. 11) may communicate based at least in part on the information, as described above.

Process 900 may include additional aspects, such as any single aspect or any combination of aspects described below and/or in connection with one or more other processes described elsewhere herein.

In a first aspect, the information indicating the carrier indicates a component carrier from among one or more component carriers within a frequency group, from among one or more frequency groups, that is preferred by the UE for uplink control communications.

In a second aspect, alone or in combination with the first aspect, the one or more component carriers are within a frequency range or are across multiple frequency ranges.

In a third aspect, alone or in combination with one or more of the first and second aspects, receiving the information comprises receiving the information via at least one TRP of a multi-TRP configuration.

In a fourth aspect, alone or in combination with one or more of the first through third aspects, the information is received in a beam management report that indicates an RSRP measurement or a signal strength measurement.

Figure 11:
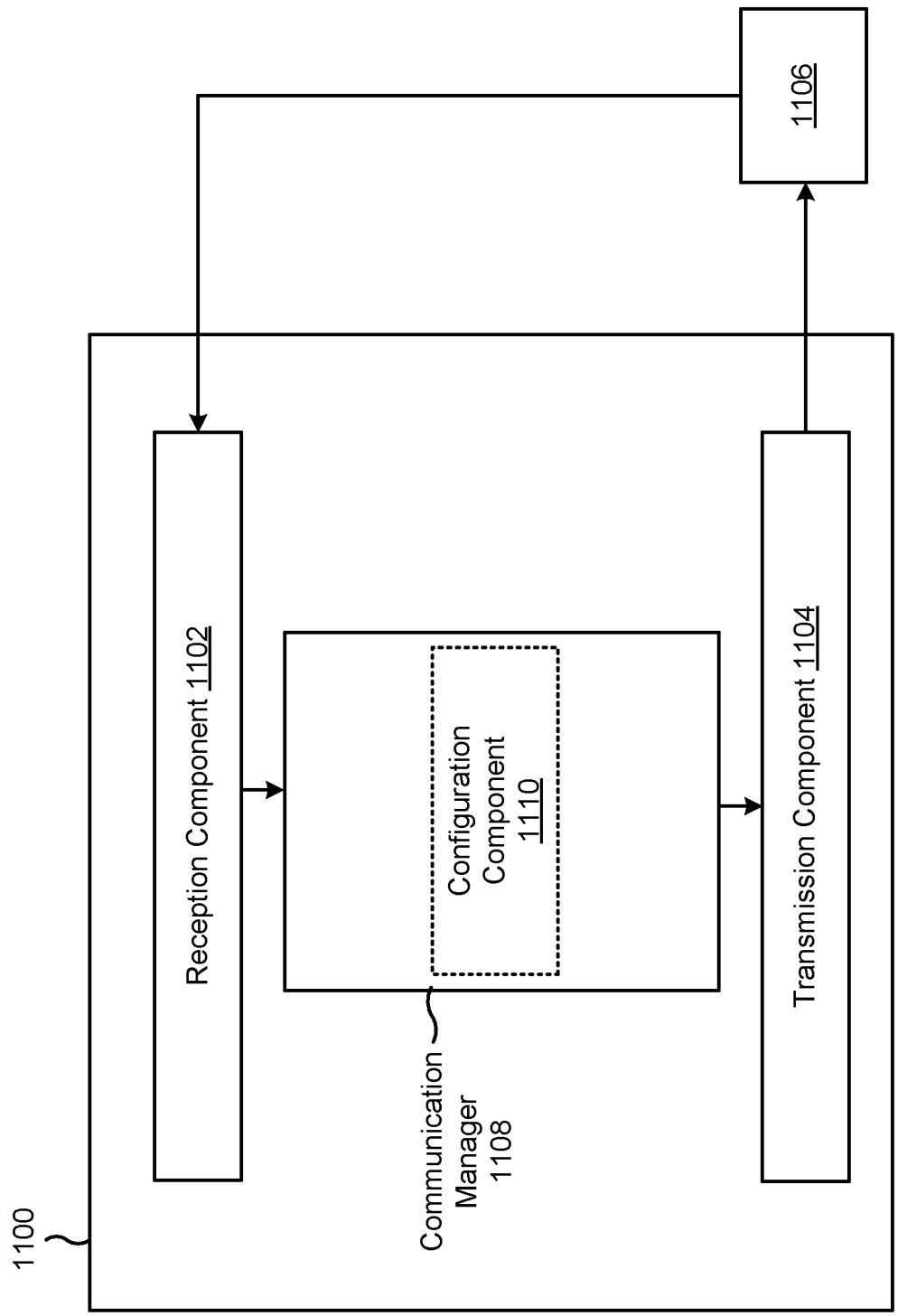

In a fifth aspect, alone or in combination with one or more of the first through fourth aspects, process 900 includes transmitting (e.g., using communication manager 1108 and/or transmission component 1104, depicted in FIG. 11) a configuration indicating a condition for the UE to transmit the information in the beam management report.

In a sixth aspect, alone or in combination with one or more of the first through fifth aspects, the condition is that a difference between a downlink signal strength and an uplink signal strength satisfies a threshold.

In a seventh aspect, alone or in combination with one or more of the first through sixth aspects, process 900 includes transmitting (e.g., using communication manager 1108 and/or transmission component 1104, depicted in FIG. 11) an indication of whether the carrier is to be used for uplink control communications.

In an eighth aspect, alone or in combination with one or more of the first through seventh aspects, the UE is capable of suspending beam correspondence for downlink and uplink beamformed transmissions by enabling amplitude control for at least one of downlink beamforming or uplink beamforming.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a determination component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit, to a network entity, information indicating a carrier, in a PUCCH group, that is a preferred primary carrier for the UE for uplink control communications with the network entity. The transmission component 1004 may communicate based at least in part on the information.

The reception component 1002 may receive, from the network entity, a configuration indicating a condition for transmitting the information in a beam management report. The reception component 1002 may receive, from the network entity, an indication of whether the carrier is to be used for uplink control communications.

The determination component 1008 may determine the carrier that is the preferred primary carrier for the UE based at least in part on at least one of whether amplitude control is enabled or a type of amplitude control that is used.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may include a configuration component 1110, among other examples. The communication manager 1108 may include, may be included in, or may perform operations similar to, the communication 150.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network entity described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network entity described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network entity described in connection with FIG. 2. In some aspects, the transmission component 1104 may be co-located with the reception component 1102 in a transceiver.

The reception component 1102 may receive information indicating a carrier, in a PUCCH group, that is a preferred primary carrier for a UE for uplink control communications. The reception component 1102 may communicate based at least in part on the information.

The transmission component 1104 may transmit a configuration indicating a condition for the UE to transmit the information in a beam management report. The configuration component 1110 may determine the configuration. The transmission component 1104 may transmit an indication of whether the carrier is to be used for uplink control communications.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting, to a network entity, information indicating a carrier, in a physical uplink control channel (PUCCH) group, that is a preferred primary carrier for the UE for uplink control communications with the network entity; and communicating based at least in part on the information.

Aspect 2: The method of Aspect 1, wherein the information indicating the carrier indicates a component carrier from among one or more component carriers within a frequency group, from among one or more frequency groups, that is preferred by the UE for uplink control communications.

Aspect 3: The method of Aspect 2, wherein the one or more component carriers are within a frequency range or are across multiple frequency ranges.

Aspect 4: The method of any of Aspects 1-3, wherein transmitting the information comprises: transmitting the information to at least one transmission reception point (TRP) of a multi-TRP configuration.

Aspect 5: The method of any of Aspects 1-4, wherein the information is transmitted in a beam management report that indicates a reference signal received power (RSRP) measurement or a signal strength measurement.

Aspect 6: The method of Aspect 5, further comprising: receiving, from the network entity, a configuration indicating a condition for transmitting the information in the beam management report, wherein the information is transmitted in the beam management report based at least in part on the condition being satisfied.

Aspect 7: The method of Aspect 6, wherein the condition is that a difference between a downlink signal strength and an uplink signal strength satisfies a threshold.

Aspect 8: The method of any of Aspects 1-7, further comprising: receiving, from the network entity, an indication of whether the carrier is to be used for uplink control communications.

Aspect 9: The method of any of Aspects 1-8, wherein the UE is capable of suspending beam correspondence for downlink and uplink beamformed transmissions by enabling amplitude control for at least one of downlink beamforming or uplink beamforming.

Aspect 10: The method of any of Aspects 1-9, further comprising: determining the carrier that is the preferred primary carrier for the UE based at least in part on at least one of whether amplitude control is enabled or a type of amplitude control that is used.

Aspect 11: A method of wireless communication performed by a network entity, comprising: receiving information indicating a carrier, in a physical uplink control channel (PUCCH) group, that is a preferred primary carrier for a user equipment (UE) for uplink control communications; and communicating based at least in part on the information.

Aspect 12: The method of Aspect 11, wherein the information indicating the carrier indicates a component carrier from among one or more component carriers within a frequency group, from among one or more frequency groups, that is preferred by the UE for uplink control communications.

Aspect 13: The method of Aspect 12, wherein the one or more component carriers are within a frequency range or are across multiple frequency ranges.

Aspect 14: The method of any of Aspects 11-13, wherein receiving the information comprises: receiving the information via at least one transmission reception point (TRP) of a multi-TRP configuration.

Aspect 15: The method of any of Aspects 11-14, wherein the information is received in a beam management report that indicates a reference signal received power (RSRP) measurement or a signal strength measurement.

Aspect 16: The method of Aspect 15, further comprising: transmitting a configuration indicating a condition for the UE to transmit the information in the beam management report.

Aspect 17: The method of Aspect 16, wherein the condition is that a difference between a downlink signal strength and an uplink signal strength satisfies a threshold.

Aspect 18: The method of any of Aspects 11-17, further comprising: transmitting an indication of whether the carrier is to be used for uplink control communications.

Aspect 19: The method of any of Aspects 11-18, wherein the UE is capable of suspending beam correspondence for downlink and uplink beamformed transmissions by enabling amplitude control for at least one of downlink beamforming or uplink beamforming.

Aspect 20: An apparatus for wireless communication at a device, comprising a processor; memory coupled with the processor; and instructions stored in the memory and executable by the processor to cause the apparatus to perform the method of one or more of Aspects 1-10.

Aspect 21: A device for wireless communication, comprising a memory and one or more processors coupled to the memory, the one or more processors configured to perform the method of one or more of Aspects 1-10.

Aspect 22: An apparatus for wireless communication, comprising at least one means for performing the method of one or more of Aspects 1-10.

Aspect 23: A non-transitory computer-readable medium storing code for wireless communication, the code comprising instructions executable by a processor to perform the method of one or more of Aspects 1-10.

Aspect 24: A non-transitory computer-readable medium storing a set of instructions for wireless communication, the set of instructions comprising one or more instructions that, when executed by one or more processors of a device, cause the device to perform the method of one or more of Aspects 1-10.

Aspect 25: An apparatus for wireless communication at a device, comprising a processor; memory coupled with the processor; and instructions stored in the memory and executable by the processor to cause the apparatus to perform the method of one or more of Aspects 11-19.

Aspect 26: A device for wireless communication, comprising a memory and one or more processors coupled to the memory, the one or more processors configured to perform the method of one or more of Aspects 11-19.

Aspect 27: An apparatus for wireless communication, comprising at least one means for performing the method of one or more of Aspects 11-19.

Aspect 28: A non-transitory computer-readable medium storing code for wireless communication, the code comprising instructions executable by a processor to perform the method of one or more of Aspects 11-19.

Aspect 29: A non-transitory computer-readable medium storing a set of instructions for wireless communication, the set of instructions comprising one or more instructions that, when executed by one or more processors of a device, cause the device to perform the method of one or more of Aspects 11-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, configured to:
        receive, from a network entity, a configuration indicating a condition for transmitting information,
            wherein the condition is that a difference between a downlink signal strength and an uplink signal strength satisfies a threshold;
        transmit, to the network entity based at least in part on the condition being satisfied, the information indicating a carrier, in a physical uplink control channel (PUCCH) group, that is a preferred primary carrier for the UE for uplink control communications with the network entity,
            wherein the information is transmitted in a beam management report that indicates a reference signal received power (RSRP) measurement or a signal strength measurement; and
        communicate based at least in part on the information.

2. The apparatus of claim 1, wherein the information indicating the carrier indicates a component carrier from among one or more component carriers within a frequency group, from among one or more frequency groups, that is preferred by the UE for uplink control communications.

3. The apparatus of claim 2, wherein the one or more component carriers are within a frequency range or are across multiple frequency ranges.

4. The apparatus of claim 1, wherein the one or more processors, to transmit the information, are configured to:
    transmit the information to at least one transmission reception point (TRP) of a multi-TRP configuration.

5. The apparatus of claim 1, wherein the one or more processors are further configured to:
    receive, from the network entity, an indication of whether the carrier is to be used for uplink control communications.

6. The apparatus of claim 1, wherein the UE is capable of suspending beam correspondence for downlink and uplink beamformed transmissions by enabling amplitude control for at least one of downlink beamforming or uplink beamforming.

7. The apparatus of claim 1, wherein the one or more processors are further configured to:
    determine the carrier that is the preferred primary carrier for the UE based at least in part on at least one of whether amplitude control is enabled or a type of amplitude control that is used.

8. An apparatus for wireless communication at an apparatus, comprising:

one or more memories; and
one or more processors, coupled to the one or more memories, configured to:
   transmit a configuration indicating a condition for a user equipment (UE) to transmit information,
      wherein the condition is that a difference between a downlink signal strength and an uplink signal strength satisfies a threshold;
   receive the information indicating a carrier, in a physical uplink control channel (PUCCH) group, that is a preferred primary carrier for the UE for uplink control communications,
      wherein the information is received in a beam management report that indicates a reference signal received power (RSRP) measurement or a signal strength measurement; and
   communicate based at least in part on the information.

9. The apparatus of claim 8, wherein the information indicating the carrier indicates a component carrier from among one or more component carriers within a frequency group, from among one or more frequency groups, that is preferred by the UE for uplink control communications.

10. The apparatus of claim 9, wherein the one or more component carriers are within a frequency range or are across multiple frequency ranges.

11. The apparatus of claim 8, wherein the one or more processors, to receive the information, are configured to:
   receive the information via at least one transmission reception point (TRP) of a multi-TRP configuration.

12. The apparatus of claim 8, wherein the one or more processors are further configured to:
   transmit an indication of whether the carrier is to be used for uplink control communications.

13. The apparatus of claim 8, wherein the UE is capable of suspending beam correspondence for downlink and uplink beamformed transmissions by enabling amplitude control for at least one of downlink beamforming or uplink beamforming.

14. A method of wireless communication performed by an apparatus of a user equipment (UE), comprising:
   receiving, from a network entity, a configuration indicating a condition for transmitting information,
      wherein the condition is that a difference between a downlink signal strength and an uplink signal strength satisfies a threshold;
   transmitting, to the network entity based at least in part on the condition being satisfied, the information indicating a carrier, in a physical uplink control channel (PUCCH) group, that is a preferred primary carrier for the UE for uplink control communications with the network entity,
      wherein the information is transmitted in a beam management report that indicates a reference signal received power (RSRP) measurement or a signal strength measurement; and
   communicating based at least in part on the information.

15. The method of claim 14, wherein the information indicating the carrier indicates a component carrier from among one or more component carriers within a frequency group, from among one or more frequency groups, that is preferred by the UE for uplink control communications.

16. The method of claim 14, further comprising:
   receiving, from the network entity, an indication of whether the carrier is to be used for uplink control communications.

17. The method of claim 14, wherein the UE is capable of suspending beam correspondence for downlink and uplink beamformed transmissions by enabling amplitude control for at least one of downlink beamforming or uplink beamforming.

18. A method of wireless communication performed by an apparatus of a network entity, comprising:
   transmitting a configuration indicating a condition for a user equipment (UE) to transmit information,
      wherein the condition is that a difference between a downlink signal strength and an uplink signal strength satisfies a threshold;
   receiving the information indicating a carrier, in a physical uplink control channel (PUCCH) group, that is a preferred primary carrier for the UE for uplink control communications,
      wherein the information is received in a beam management report that indicates a reference signal received power (RSRP) measurement or a signal strength measurement; and
   communicating based at least in part on the information.

19. The method of claim 18, wherein the information indicating the carrier indicates a component carrier from among one or more component carriers within a frequency group, from among one or more frequency groups, that is preferred by the UE for uplink control communications.

20. The method of claim 18, further comprising:
   transmitting an indication of whether the carrier is to be used for uplink control communications.

21. The apparatus of claim 1, wherein the one or more processors are further configured to:
   transmit, to the network entity, an indication of an amplitude control capability of the UE.

22. The apparatus of claim 8, wherein the one or more processors are further configured to:
   receive an indication of an amplitude control capability of the UE.

23. The method of claim 14, further comprising:
   transmitting, to the network entity, an indication of an amplitude control capability of the UE.

24. The method of claim 15, wherein the one or more component carriers are within a frequency range or are across multiple frequency ranges.

25. The method of claim 14, wherein transmitting the information comprises:
   transmitting the information to at least one transmission reception point (TRP) of a multi-TRP configuration.

26. The method of claim 14, further comprising:
   determining the carrier that is the preferred primary carrier for the UE based at least in part on at least one of whether amplitude control is enabled or a type of amplitude control that is used.

27. The method of claim 18, further comprising:
   receiving an indication of an amplitude control capability of the UE.

28. The method of claim 19, wherein the one or more component carriers are within a frequency range or are across multiple frequency ranges.

* * * * *